UNITED STATES PATENT OFFICE.

CARL ALEXANDER MARTIUS, OF BERLIN, GERMANY.

PRODUCING MIXED AZO COLORS.

SPECIFICATION forming part of Letters Patent No. 344,971, dated July 6, 1886.

Application filed January 23, 1886. Serial No. 189,521. (Specimens.) Patented in Germany August 28, 1885, January 26, 1886, and January 27, 1886; in England February 15, 1886, No. 2,213, and in France May 4, 1886, No. 163,172.

*To all whom it may concern:*

Be it known that I, CARL ALEXANDER MARTIUS, doctor of philosophy, a subject of the King of Prussia, German Empire, residing at the city of Berlin, in the Kingdom of Prussia, German Empire, have invented certain new and useful Improvements in the Process of Producing Mixed Azo Colors, of which the following is a specification.

This invention is based on the inventions made by Paul Böttiger for the production of coloring-matter from benzidine, from which azo colors are obtained by a combination of salts of tetrazodiphenyl with naphthionic acid, and is designed to shorten the process of producing said azo colors and producing mixed azo colors having somewhat different characteristics.

In the Böttiger process the mixture of the salts of tetrazodiphenyl with naphthionic acid takes place slowly and has to stand for some time—viz., for about twelve hours. This is required owing to the fact that by the action of one molecule of the tetrazo compound upon two molecules of naphthionate of soda the red coloring-matter (known in the market as "Congo red") is not formed instantaneously, but that at first an intermediate product is formed which consists of one molecule of tetrazodiphenyl and one molecule of naphthionic acid, and which acts upon the second molecule of naphthionic acid only after some time. The other amines and amido-acids employed in the production of azo colors from benzidine act analogous to the naphthionic acid. At first always one molecule of an amine or an amido-acid forms an intermediate product, which can afterward be combined with the second molecule of an amine or phenol or their sulpho-acids. This forms the underlying principle of the Böttiger invention. When, however, one molecule of another amine or amido-acid or phenol sulpho-acid is allowed to act upon the intermediate product, mixed azo colors are obtained. They may be produced as well by first combining the tetrazo compound with the phenols and by acting afterward upon the amines. The characteristic property of all these latter is the facility with which they dye cotton from an alkaline bath without the use of a mordant. In all cases the salts of tetrazodiphenyl may be replaced by salts of tetrazoditolyl.

Example I: *Coloring-matter from benzidine, alpha-naphthylamine sulpho-acid, and beta-naphthylamine sulpho-acid.*—18.4 kilograms of benzidine are in the well-known manner converted into the muriatic tetrazo compound. A solution of the same in one thousand liters of water is entered into a solution containing 12.2 kilograms alpha-naphthylamine naphthionate of soda and thirty-two kilograms of acetate of soda in nine hundred liters of water, whereby the above-mentioned intermediate product forms itself as a brown precipitate which is insoluble in alkalies. If, now, a solution of 12.2 kilograms of beta-naphthylamine sulphonate of soda in one hundred liters of water is poured out upon that intermediate product, and if the mixture is stirred for a longer period, an azo color is formed which is soluble in alkalies, and which dyes shades similar to Böttiger's red dye-stuff, (Congo,) but somewhat yellower. This reaction can also be reversed, inasmuch as the tetrazodiphenyl is at first combined with the beta-naphthylamine sulpho-acid. Afterward the intermediate product thus obtained is made to act upon alpha-naphthylamine sulpho-acid.

Alpha-naphthylamine sulphonate of sodium
$C_6H_4—N=N—C_{10}H_5SO_3NaNH_2$

Beta-naphthylamine sulphonate of sodium
$C_6H_4—N=N—C_{10}H_5SO_3NaNH_2$

Example II: *Coloring-matter from benzidine, alpha-naphthylamine, and meta-sulphanilic acid.*—In Example I, Process I, the beta-naphthylamine sulpho-acid can be replaced by meta-sulphanilic acid. In that case 9.75 kilograms of meta-amidobenzole sulphonate of soda are to be used instead.

Alpha-naphthylamine sulphonate of sodium
$C_6H_4—N=N—C_{10}H_5SO_3NaNH_2$
$C_6H_4—N=N—C_6H_3SO_3NaNH_2$ Metanilsulphonate of sodium.

Example III: *Coloring-matter from benzidine, alpha-naphthylamine sulpho-acid, and alpha-naphthol sulpho-acid.*—The above-mentioned intermediate products can also be combined to new mixed azo colors with phenols, respectively, napthols, and their sulpho-acids. When, in Example I, Process I, the quoted quantity of beta-naphthylamine sulphonate of soda is replaced by 12.3 kilograms of alpha-naphthol sulphonate of soda, a color is obtained which dyes cotton a violet shade. The same color, as is already stated above, may be obtained as well by first combining the tetrazodiphenyl with alpha-naphthol sulpho-acid, and by acting afterward with the intermediate product thus obtained upon alpha-naphthylamine sulpho-acid.

Alpha-naphthylamine sulphonate of sodium
$$C_6H_4-N=N-C_{10}H_5SO_3NaNH_2$$
$$\alpha$$
$$C_6H_4-N=N-C_{10}H_5SO_3NaOH$$
Alpha-naphthol sulphonate of sodium.

Example IV: *Coloring-matters from diamido-ditolyl, alpha-naphthylamine sulpho-acid, and beta-naphthylamine sulpho-acid.*—When, in Example I, the benzidine is replaced by the equivalent quantity of diamidoditolyl, a color is obtained which is very similar to Böttiger's red.

Alpha-naphthylamine sulphonate of sodium
$$\begin{pmatrix} CH_3 \\ C_6H_3-N=N-C_{10}H_5SO_3NaNH_2 \\ \beta \\ C_6H_3-N=N-C_{10}H_5SO_3NaNH_2 \\ CH_3 \end{pmatrix}$$
Beta-naphthylamine sulphonate of sodium.

Having thus described my invention, I claim as new and desire to secure by Letters Patent—

The process of producing mixed azo colors, which consists in combining one molecule of a salt of tetrazodiphenyl or tetrazoditolyl with one molecule of an aromatic amido compound, and combining the product thus obtained with one molecule of a different aromatic amido compound, or of a phenol compound, substantially as set forth.

In testimony whereof I have signed my name to this specification in the presence of two subscribing witnesses.

CARL ALEXANDER MARTIUS.

Witnesses:
A. MÜHLE,
B. ROI.